3,251,908
METHOD AND APPARATUS FOR MAKING A
CURVED SURFACE
George P. T. Wilenius, Kenneth B. Eacott, and Gerard
W. Wheeler, Ottawa, Ontario, Canada, assignors to
Computing Devices of Canada Limited, Ottawa, Ontario, Canada
Filed Dec. 5, 1962, Ser. No. 242,450
11 Claims. (Cl. 264—1)

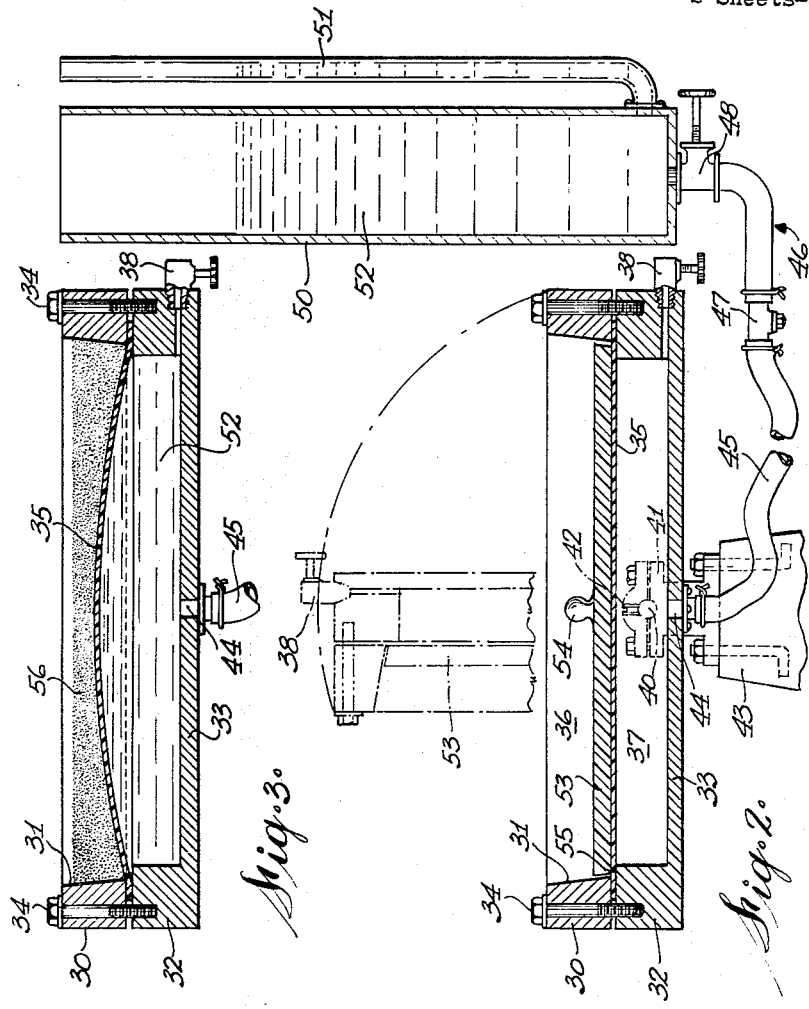
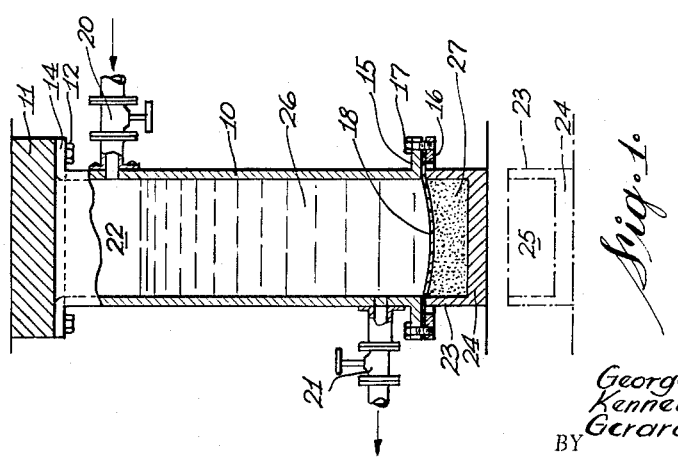

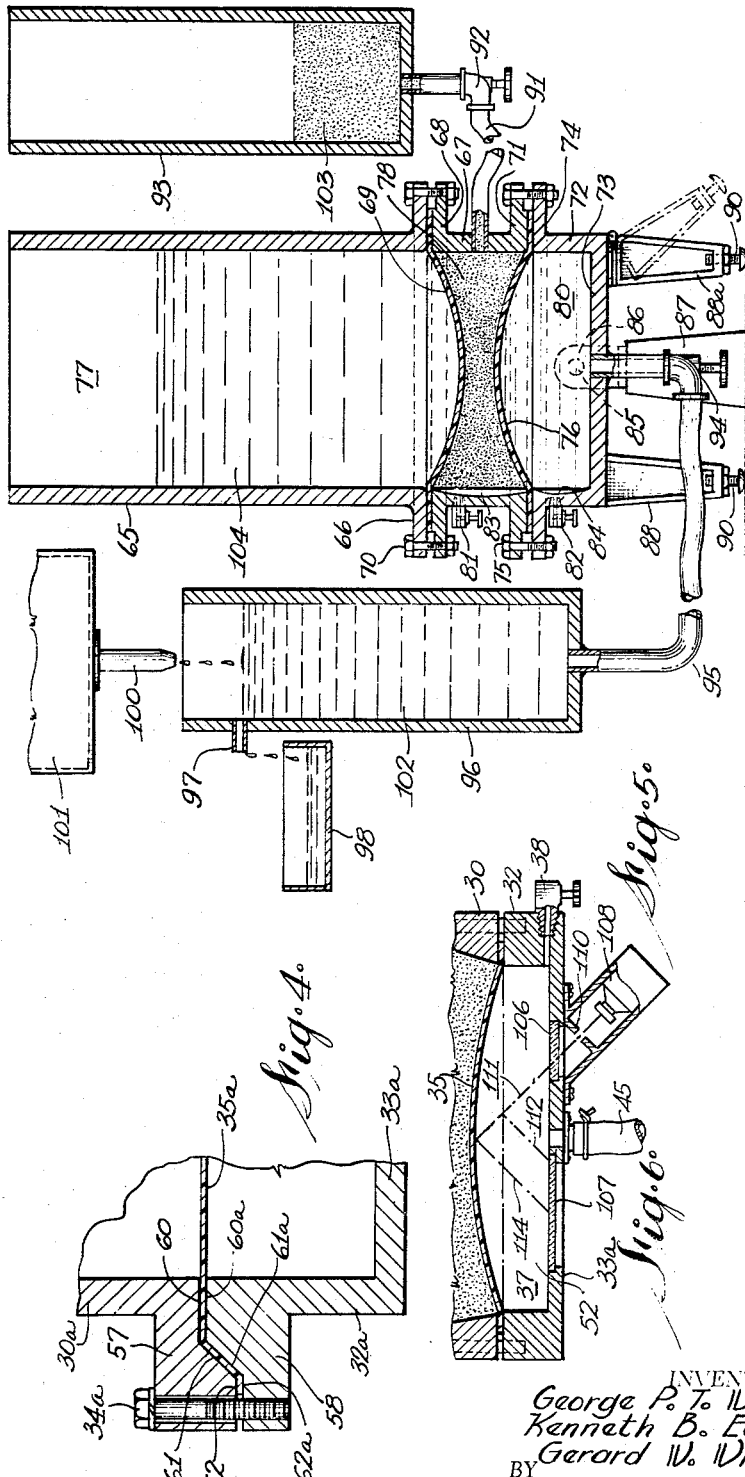

This invention relates to the making of curved surfaces, and in a particular form thereof it relates to the making of paraboloidal surfaces.

In many fields smooth regularly curved surfaces are useful. For example, regularly curved surfaces of good accuracy are useful in the making of optical lenses, optical reflectors or mirrors, or in the making of reflectors for other forms of electromagnetic radiation such as VHF and UHF radio wave radiation. One form of curved surface that is especially desirable in reflectors is a concave paraboloidal surface, and this invention is particularly adapted for making such a surface.

In the past concave reflecting surfaces have been made in various ways. One known way of making a concave optical reflector is to slowly grind and polish an individual block of glass while continually checking to ensure that the surface is approaching the desired curvature. This may produce a reflecting surface of high accuracy, however the procedure is very slow, tedious and expensive. Another known way of making concave reflectors for less rigid optical requirements is by spinning and polishing aluminum. This, of course, is not a direct manner of making a curved surface as it requires a form having a required curvature which in itself may be expensive, and the resulting reflector is not of high quality. Yet another way of producing concave reflecting surfaces is by spinning a container of liquid plastic material at a constant speed about a substantially vertical axis whereby the liquid surface takes a paraboloidal form or configuration, and then hardening the material. This last mentioned way of producing a curved surface requires apparatus that is capable of rotating a container at a very constant speed with exceedingly little vibration, and consequently the apparatus is relatively expensive.

The present invention provides a method and apparatus for making a concave reflecting surface that overcomes disadvantages of the prior art.

It is an object of the invention to provide an improved direct method for forming a curved surface by utilizing a membrane.

It is another object of the invention to provide an improved inexpensive method of forming a concave or convex paraboloidal surface of good accuracy requiring no forms or special moulds.

It is yet another object of the invention to provide novel, inexpensive and simply constructed apparatus for making a curved surface.

These and other objects and advantages of the invention will be apparent from the following description taken in conjunction with the accompanying drawings, in which FIGURE 1 is a side view, partly in section, of apparatus used in the making of a curved surface in accordance with a simple form of the invention, FIGURE 2 is a side view, partly in section, of apparatus in accordance with another embodiment of the invention and illustrating a certain step in the forming of the curved surface, FIGURE 3 is a side view, partly in section of a portion of the apparatus of FIGURE 2 illustrating another stage in the forming of the curved surface, FIGURE 4 is a fragmentary sectional view of an alternative membrane clamping means, FIGURE 5 is a side view, partly in section, of apparatus for forming curved surfaces in accordance with another embodiment of the invention, and FIGURE 6 is a diagrammatic view of a part of the apparatus of FIGURES 2 and 3 according to the invention and incorporating a membrane deformation measuring means.

Briefly, the invention is for making a curved surface by utilizing a membranous diaphragm, or more simply, a membrane. The membrane is secured peripherally to separate two zones or chambers. A first liquid is introduced into one zone and a second liquid is introduced into the other zone, each under a different head. This causes the membrane to deform or curve smoothly towards the zone with the lesser head. One of the first and second liquids is a hardenable liquid plastic material, and this is hardened when a desired curvature is obtained. The hardened plastic material then is removed. The membrane may be removed, but it is preferred to have it adhere to the hardened plastic providing a smooth surface.

A paraboloidal surface, that is, a surface such as would be formed by a revolved parabola, may be formed by the invention. Certain condiitons are necessary to achieve a paraboloidal surface. These conditions are that the membrane should be uniform, thin, and circular, and that the first and second liquids should be of the same density.

The following theory is believed to be applicable to the present invention with regard to the making of paraboloidal surfaces.

Theory

When a thin membrane is subjected to a pressure differential, it forms a curved surface that is suitable for use as a reflecting surface. The differential equation of the surface co-ordinates of a dilated thin membrane is:

$$\frac{d^2z}{dr^2} + \frac{1}{r}\cdot\frac{dz}{dr} + \frac{(P)}{\tau} = 0$$

where

P = pressure differential
$\tau$ = tensile force in membrane
r = radial co-ordinate
z = vertical co-ordinate When the boundary conditions applicable to a circular membrane of radius $r_0$ clamped at its edges, are applied to the above equation, the following equation is obtained:

$$z = \frac{1}{4}\left(\frac{P}{\tau}\right)(r_0^2 - r^2)$$

This equation represents a paraboloidal surface.

In the above equations P represents pressure differential. It will be seen from this that to obtain a paraboloidal surface the pressure differential should be uniform over the membrane surface. The hydrostatic pressures exerted by the two liquids on either side of the membrane vary radially across the membrane and this variation depends on the densities of the liquids and the vertical deflection of the membrane at any given radius. Since the vertical deflections at the upper and lower surfaces of the membrane are equal, the variation in hydrostatic pressure is proportional to the densities. Thus, for a constant or uniform pressure differential the two liquids must have the same density.

Description

Referring now to FIGURE 1, a cylindrical side wall 10 is shown secured to a mount 11 by bolts 12 through an upper flange 14. The side wall 10 is a right cylinder, that is, the planes defining its upper and lower edges are at right angles to its axis. A flange 15 projects outwardly from wall 10 extending the lower ends of side wall 10. A ring 16 may be clamped against the flange 15 by bolts 17. A membrane 18 extends over the lower edge of side wall 10 including the lower flange surface and is secured peripherally between the lower cylinder edge and ring 16. An inlet valve 20 and an outlet valve 21 are provided in side wall 10 adjacent the upper and lower ends thereof, respectively. The side wall 10 defines a chamber or zone 22 bounded at its lower end by the membrane 18.

Below the cylindrical side wall 10 is a cylindrical side wall 23 having a bottom closure 24 defining a chamber or zone 25.

In making a curved surface with the FIGURE 1 apparatus, a membrane is cleaned and, if desired, coated with a reflecting material such as a thin aluminized film, and then clamped in position across the end of cylindrical side wall 10 by ring 16 and bolts 17. The cylindrical side wall 23 with its bottom closure 24 defining chamber 25 is positioned directly below cylindrical side wall 10 as indicated in phantom.

Then the valve 20 is opened to introduce a liquid 26 into chamber 22 to a desired level thereby providing a desired pressure head deforming the membrane 18 downwardly. The mould, i.e., side wall 23 with bottom 24, is filled to the top with a hardenable liquid plastic material 27. If a hardening agent is required it is normally thoroughly mixed with the liquid plastic material 27 just before the material 27 is introduced into the mould. The mould is then raised with walls 10 and 23 in alignment until the upper edge of side wall 23 abuts against membrane 18. The membrane 18 assumes a curvature depending on the pressure differential and the apparatus remains in this position until plastic material 27 hardens.

Once the plastic material 27 is hardened or set, the valve 21 is opened and liquid 26 substantially drained from chamber 22. Bolts 17 and clamping ring 16 are removed to release the edge of the membrane. If the membrane was prepared beforehand to prevent adhesion it may be removed from the plastic material. It is, however, preferred to have the membrane adhered to the plastic material as it provides a good surface for most applications. To ensure good adhesion between the membrane and the plastic material, it is desirable to have the membrane surface scrupulously clean. A thorough cleaning of the membrane surface with alcohol or similar substance will normally result in good adhesion.

When the curved surface is to be used as a reflector, a reflecting coating must be applied at some time. As was previously suggested, a thin aluminum film may be used as the reflecting coating. Such a film may, of course, be applied to the finished curved surface. Alternately a reflecting coating may be applied to the membrane before it is installed or mounted across the end of chamber 22. The reflecting coating may face chamber 22 so that the reflecting coating is exposed in the finished reflector. Alternately the membrane may be mounted with the reflecting coating facing chamber 25 so that it contacts the plastic material. In this last case, the reflecting coating in the finished reflector is between the membrane and the hardened plastic material so that the membrane will provide some protection for the reflecting surface. In this case, obviously, the membrane must be sufficiently transparent to pass the radiation that is to be reflected.

The type and thickness of membrane is not critical. It should have a high tensile strength and should be of a thickness that will permit ready deformation or dilation by the desired amount. Satisfactory results have been achieved using a polyester film sold under the trademark Mylar in thicknesses of the order of 0.00025 inch for reflectors of 3 inch and 4 inch diameters and of the order of 0.002 to 0.016 inch for reflectors of about 14 inches diameter. However, it should be emphasized that the type and size of membrane is not critical and other types of thicknesses different from those given above provide satisfactory results.

The liquid plastic material should be capable of hardening in relatively large masses without exothermic heating and with little shrinkage. Commercial casting resins are available which are satisfactory in these respects. One such resin is sold under the trade name of Stycast 2850 GT by the Emerson Cumming Company of Canton, Massachusetts. Other plastic materials meeting the requirements of low heat generation and low shrinkage may be used.

In the FIGURE 1 apparatus it is sometimes difficult to ensure that no air is trapped below the membrane, that is between the membrane and the liquid plastic material. In other words, it is difficult to ensure that the liquid plastic material contacts substantially the entire surface of the membrane. Entrapped air will, of course, spoil the finished surface in the region where it is trapped. This difficulty is overcome by using apparatus shown in FIGURES 2 and 3.

Referring now to FIGURES 2 and 3, there is shown a right cylindrical side wall 30. The inner surface 31 of side wall 30 may be tapered slightly, with the diameter increasing towards the upper side, to facilitate removal of hardened plastic material which is cast therein. A right cylindrical side wall 32 having a bottom closure 33 is mounted to side wall 30 by bolts 34 which pass through holes in side wall 30 and threadedly engage holes in side wall 32 as shown. The diameters of side walls 30 and 32 are substantially the same and they are aligned when fastened together. A membrane 35 is clamped between the lower edge of side wall 30 and the upper edge of side wall 32. The cylindrical side wall 30 defines a chamber 36 and the side wall 32 with its bottom closure 33 defines a chamber 37. The membrane 35 separates the chambers 36 and 37.

A bleed valve 38 extends through side wall 32 communicating with chamber 37. The side wall 32 and bottom closure 33 are mounted for tipping or rotating motion so that the entire assembly including side wall 32 with bottom closure 33 and side wall 30 may be rotated from a horizontal position (shown by solid lines in FIGURE 2) to a vertical position (indicated in phantom in FIGURE 2) with the bleed valve 38 uppermost to bleed air from chamber 37. The rotatable mount comprises a pair of diametrically opposed external projections on side wall 32. One of these projections is shown in phantom in FIGURE 2 as 40. These diametrically positioned projections 40 are equally spaced from bleed valve 38 so that when the assembly is rotated the bleed valve 38 will be at the highest point as indicated in FIGURE 2 in phantom. Stationary bearing support members 41, only one of which appears in FIGURE 2 in phantom, are mounted to a base 43 engaging projections 40 and supporting them for rotary movement therein. Thus the assembly of the two side walls may be rotated or tipped. The assembly may be locked in a horizontal position or level position by tightening a set screw 42 or by equivalent means.

The bottom closure 33 is provided with a centrally located opening 44 to which is coupled one end of a flexible conduit 45. The other end of conduit 45 is coupled to a reservoir outlet 46 including a drain valve 47 and a control valve 48 for opening and closing the outlet. A reservoir 50 has a liquid level indicator 51 with a transparent indicator portion connected to it, and the reservoir outlet 46 is at the bottom of reservoir 50.

To make a concave surface, the apparatus is prepared as in FIGURE 2 with membrane 35 clamped between the lower and upper edges of side walls 30 and 32 respectively, and a supply of a liquid 52 is placed in reservoir 50. As was previously mentioned, for making paraboloidal concave surfaces, the density of liquid 52 should be the same as the density of the liquid plastic material used to cast the surface. Many liquids of different densities are known and are suitable. As one example, acetylene tetrabromide is a satisfactory liquid. It is industrially available and is clear, non-toxic, and has a specific gravity of 3. It may be dissolved in suitable proportions of alcohol to provide liquids of lesser specific gravities. Other liquids, however, are equally satisfactory and the selection should present no problem.

A retaining disc 53 with a handle 54 for convenient holding is placed over the membrane 35. A small lip 55 provided by the upper edge of wall 32 extending inwards a short distance past wall 30 supports the retaining disc 53, that is, supports it from deforming the membrane 35. Valve 48 is opened to permit liquid 52 to enter the conduit 45 and pass into chamber 37. The assembly comprising the two cylindrical walls 30 and 32 secured together by bolts 34, is tipped or rotated to a vertical position as shown in phantom in FIGURE 2. The bleed valve 38 is opened to permit air to escape from chamber 37. Liquid 52 flows into chamber 37 and fills it. Retaining disc 53 is held in position against membrane 35 supported by lip 55 and prevents the membrane 35 from moving outwards or deforming. When liquid 52 runs freely from bleed valve 38 indicating that all the air has been removed and liquid 52 contacts the entire exposed surface of membrane 35, the valve 38 is closed and the assembly rotated to its horizontal position. The assembly is carefully levelled and locked in this position by set screw 42. Then the retaining disc 53 is removed and a hardenable liquid plastic material 56 is placed in chamber 36. The hardening agent may be mixed with the plastic material 56 before it is introduced into chamber 36, if required. The levels of liquids 52 and 56 are adjusted to give required pressure heads in chambers 37 and 36 and thereby cause membrane 35 to take a desired curvature. The curvature or deformation of the membrane can be measured while the heads are being adjusted, and one way of doing this is described hereinafter with reference to FIGURE 6. Referring now to FIGURE 3, there is shown a sectional view of the assembly of the two side walls at this stage in the making of the concave surface. When the plastic material 56 has hardened or set, valve 48 can be closed, chamber 37 drained, side wall 30 removed, and the hardened plastic material 56 with diaphragm 35 removed from the side wall 30.

It is important that both liquids 52 and 56 should be in contact with substantially the entire facing surface of the membrane. Not only should all air and gases be removed when the chambers 36 and 37 are filled, but no gas bubbles should be permitted to form in the liquids until the plastic material 56 has set. To ensure that no gas bubbles form in the casting liquid 56 it may be desirable to vacuum treat the liquid 56 before pouring it into chamber 36. The liquid 52 may be similarly vacuum treated or it may be heated to drive off dissolved air and then cooled.

The membrane 35 must be uniformly tensioned when it is installed between the side walls 30 and 32. If it is not uniformly tensioned, the membrane may cause wrinkles to form in the finished surface. The embodiment of FIGURE 4 aids in uniformly tensioning membrane 35.

Referring now to FIGURE 4, a lower portion of side walls 30 of FIGURE 3 is shown as 30a, and an upper portion of side wall 32 is shown as 32a. An outwardly projecting flange 57 at the lower edge of side wall 30a extends the lower surface or mating surface of the side wall 30a as will be described. Similarly, an outwardly projecting flange 58 at the upper edge of side wall 32a extends the upper surface or mating surface of side wall 32a. The mating surfaces of the two flanges 57 and 58 must, of course, have the same configuration and may be considered together. The mating surface of both flanges may be considered as having three portions. The first portion 60 and 60a on flanges 57 and 58, respectively, extends outwardly from the inner surface of the respective side wall in a direction at right angles thereto for a predetermined distance. The second portion 61 and 61a is contiguous with the first portion and extends outwardly and downwardly at an angle thereto towards the plane of bottom closure 33a. The third portion 62 and 62a is contiguous with the second portion and extends outwardly parallel to the first portion.

When the two side walls are being assembled with the membrane between the mating edges, the configuration of the mating edges as in FIGURE 4 tends to pull the membrane because of the sloping surface 61, 61a and to distribute the forces evenly around the membrane periphery.

Referring now to FIGURE 6, there is shown part of the apparatus of FIGURES 2 and 3 adapted to measure the deformation of the membrane. The liquid in chamber 37 should be transparent for satisfactory operation of the measuring means, and the membrane should be capable of reflecting a beam of light. A previously applied reflecting coating will serve in the deformation measurement, and it may be the reflecting coating already discussed and serving as the final reflecting surface in a finished reflector.

In FIGURE 6, the cylindrical side wall 32 has a bottom closure 33a which contains two transparent windows 106 and 107. A light projector 108 is fixed to bottom closure 33a and projects a collimated beam of light through slot 110 and window 106 as shown. Membrane 35 is shown in its undeflected or undeformed position in phantom and in its deformed position in solid lines. The narrow beam of light passing through window 106 is indicated as 111, and this beam passes through liquid 52 in chamber 37 to be reflected by the reflecting coating on membrane 35. When the membrane is in its undeformed position the light is reflected along path 112, and when it is in a deformed position, as shown, the light is reflected along path 114. The position of the reflected beam is observed through window 107. The window 107 may bear graduations and the position of the reflected beam of light on window 107 may be calibrated to give the amount of membrane deformation. Thus, the deformation can be ascertained and the heads adjusted to achieve a desired deformation.

In many instances, in the making of curved surfaces in accordance with the invention, it takes considerable time for the plastic material to harden. It will be understood that to make accurate curved surfaces, the heads must be kept constant until the plastic material hardens or sets. This can be done by using a continuous stream of liquid supply to the reservoir which has an overflow outlet at a desired level. The overflow prevents the level rising, i.e., prevents an increase in the pressure head, and the continuous addition of liquid maintains the level at the overflow. This apparatus is shown in FIGURE 5 and will be described in connection therewith. It will, however, be understood that it can be used in other apparatus, such as the apparatus already described.

Referring now to FIGURE 5, there is shown apparatus for applying the invention to the making of lenses. A right cylindrical side wall 65 has a flange 66 at its lower end, and a right cylindrical side wall 67 of the same inner diameter has a flange 68 at its upper end. The facing surfaces of the flanges clamp a membrane 69 peripherally therebetween. The flanges 66 and 68 are provided with a series of aligned holes spaced therearound for receiving bolts 70 to clamp the side walls 65 and 67 together with membrane 69 between the facing surfaces of flanges 66 and 68. In a like manner, the side wall 67 has a flange 71 at its lower end, and a right cylindrical side wall 72 with a bottom closure 73 has a flange 74 at its upper edge. The flanges 71 and 74 are provided with a series of aligned holes spaced therearound for receiving bolts 75 which secure side walls 67 and 72 together with a membrane 76 clamped between the facing surfaces of flanges 71 and 74. The three side walls, when assembled, form a structure with side wall 65 defining a chamber 77, side wall 67 defining a chamber 78, and side wall 72 with bottom closure 73 defining a chamber 80. The membranes 69 and 76 separate respectively chambers 77 from 78 and chambers 78 from 80.

The side wall 67 has a bleed valve 81 which extends therethrough to communicate with chamber 78, and side wall 72 has a bleed valve 82 to communicate with chamber 80. The valves 81 and 82 are in the same radial position, that is, one above the other. To aid in the bleeding action, it may be desirable to provide a little curved passage in side walls 67 and 72 adjacent and leading to valves 81 an 82. These curved passages are shown as 83 and 84.

As before, the assembled structure comprising side walls 65, 67, and 72 is mounted for tipping so that the bleed valves are uppermost. Side wall 72 has diametrically opposed bearing projections, one of which is shown in phantom as 85, and these projections are supported in bearing support members, one of which is shown in phantom as 86. The bearing supports 86 are mounted to a base 87. Thus, the entire assembly of side walls 65, 67 and 72 may be rotated about an axis defined by projections 85 to a position where the bleed valves 81 and 82 are uppermost.

The bottom closure 73 of the lowest side wall 72 has legs thereon, indicated at 88 and 88a, with levelling screw members 90 at the foot of each leg. There may be four legs but only two are seen in FIGURE 5. The screw members 90 may be adjusted to hold the assembly level, that is, with the membranes horizontal. The leg 88a is pivoted at 91 to enable it to be swung out of the way, as indicated in phantom, when the assembly is to be rotated for bleeding of chambers 78 and 80.

The side wall 67 has an opening therein remote from bleed valve 81 to which a flexible conduit 91 is coupled. The other end of conduit 91 is coupled to a valve 92 which serves as both a control valve and a drain valve. The valve 92 is in the bottom of a reservoir 93. Thus, the reservoir 93 may contain a liquid which may flow into chamber 78 at a head determined by the liquid level in reservoir 93.

The bottom closure 73 is provided with an opening to which a valve 94 is coupled. Valve 94 may be used as a control valve and a drain valve. A flexible conduit 95 couples the valve 94 to the bottom of a reservoir 96. Thus, the reservoir 96 may contain a liquid which may flow into chamber 80 at a head determined by the liquid level in reservoir 96.

It may be desirable to maintain a constant head of pressure in chamber 80 by keeping the level of liquid in reservoir 96 constant. For this purpose, reservoir 96 has an overflow outlet 97. If the liquid level tends to increase above the level of the outlet the excess flows out outlet 97 into a container 98. On the other hand, the level is prevented from falling below the level of outlet 97 by a continuous flow of added liquid through a nozzle 100 from a supply reservoir 101. The overflow from container 98 may be recirculated to supply reservoir 101 if desired. The head in chamber 80 may be adjusted by raising or lowering the reservoir 96. This type of level control may be applied to any of the reservoirs already discussed where a constant head is desired.

It is believed that the method of using the FIGURE 5 apparatus to make a lens will be apparent. The apparatus is assembled as in FIGURE 5, then a selected liquid 102 is introduced into reservoir 96. Only sufficient liquid 102 for bleeding should be introduced at this time to keep the head low and avoid excessive pressure on membrane 76. Similarly, a hardenable plastic liquid material 103 is selected, and, if necessary, a hardener added. This liquid 103 must, of course, harden to a transparent plastic material inasmuch as it will form the finished lens. Only sufficient liquid plastic material is added for bleeding to avoid excessive pressure on the membranes 69 and 76.

The valves 92 and 94 are opened and the structure comprising side walls 65, 67 and 72 is tipped to bring bleed valves 81 and 82 uppermost. The bleed valves 81 and 82 are opened until all the air is bled from chambers 78 and 80. The bleed valves are then closed and the side wall structure returned to its upright position. The screw members 90 are adjusted to level the structure and a liquid 104 introduced into chamber 77. The levels of the liquids 102, 103 and 104 are adjusted to achieve required heads in chambers 80, 78 and 77 and thus provide desired membrane curvature. When the plastic material has hardened the apparatus may be dismantled to remove the hardened plastic material in chamber 78. As before, the membranes 69 and 76 may be adhered to the plastic or they may be treated at the beginning to permit removal from the hardened plastic surface. The liquids may be vacuum-treated to remove air and other gases as was previously described.

In the manufacture of lenses, reflectors and the like, where greater accuracy is required, temperature control of the liquids may be desirable, and heat exchange coils may be mounted within the chamber or chambers not having the hardenable plastic material.

The invention may be used to form curved surfaces for the making of moulds to be used for subsequent casting of objects having curved surfaces.

It will be seen that the present invention provides a novel and simple method and apparatus for directly making curved surfaces of good accuracy in a plastic material.

We claim:

1. A method of utilizing a membrane to form a curved surface comprising,
    dividing a chamber into two zones with said membrane,
    directing into one of said zones a fluid under a first head and into contact with substantially the entire surface of one side of said membrane,
    directing into the other of said zones a hardenable liquid plastic material under a second head and into contact with substantially the entire surface of the opposite side of said membrane, and
    hardening the liquid plastic material.

2. A method of utilizing a membrane to form a curved surface comprising,
    dividing a chamber into an upper and a lower zone with said membrane,
    directing into one of said zones a liquid under a first head and into contact with substantially the entire surface of one side of said membrane,
    directing into the other of said zones a hardenable liquid plastic material under a second head and into contact with substantially the entire surface of the opposite side of said membrane, and
    hardening the liquid plastic material.

3. A method of utilizing a membrane to form a curved surface comprising,
    dividing a chamber into an upper and a lower zone with said membrane,
    directing into one of said zones a liquid under a first head and into contact with substantially the entire surface of one side of said membrane,
    directing into the other of said zones a hardenable liquid plastic material under a second head and into contact with substantially the entire surface of the opposite side of said membrane,
    adjusting said first and second heads to achieve a desired curvature of the membrane, and
    hardening the liquid plastic material.

4. A method of forming a paraboloidal surface by utilizing a membrane comprising,
    dividing a chamber into an upper and a lower zone with said membrane,
    directing into one of said zones a liquid having a predetermined density under a first head and into contact with substantially the entire surface of one side of said membrane, directing into the other of said zones a hardenable liquid plastic material having a density the same as said predetermined density under a second head and into contact with substantially the entire surface of the opposite side of said membrane causing said membrane to take a paraboloidal curvature, and hardening the liquid plastic material.

5. A method of forming a paraboloidal surface by utilizing a membrane comprising, dividing a chamber into an upper and a lower zone with said membrane, directing into the lower zone a liquid having a predetermined density under a first head, bleeding entrapped air from said lower zone so that the liquid therein is in contact with substantially the entire lower surface of said membrane, directing into the upper zone a hardenable liquid plastic material having a density the same as said predetermined density under a second head and into contact with substantially the entire upper surface of said membrane causing said membrane to take a paraboloidal curvature, and hardening the liquid plastic material.

6. A method of utilizing a membrane to form a curved surface comprising, dividing a chamber into two zones with a membrane having a reflecting coating on one surface thereof, directing into one of said zones a fluid under a first head and into contact with substantially the entire surface of one side of said membrane, directing into the other of said zones a hardenable liquid plastic material under a second head and into contact with substantially the entire surface of the opposite side of said membrane, and hardening the liquid plastic material adhering the coated membrane thereto.

7. A method of forming a paraboloidal reflecting surface by utilizing a membrane comprising, coating said membrane on one surface with a reflecting coating, dividing a chamber into an upper and a lower zone with said membrane, said reflecting coating facing said lower zone, vacuum-treating a liquid of a predetermined density to remove entrapped gases and directing the treated liquid into the lower zone under a first head, bleeding air from the lower zone so that said treated liquid is in contact with the entire exposed coated surface of said membrane, vacuum-treating a hardenable liquid plastic material having a density equal to said predetermined density to remove entrapped gases and directing the treated liquid plastic material into the upper zone under a second head and into contact with the entire exposed upper surface of said membrane, adjusting the first and second heads to achieve a desired paraboloidal curvature of the membrane, and hardening the liquid plastic material adhering the coated membrane thereto.

8. A method of forming a paraboloidal reflecting surface by utilizing a substantially transparent membrane comprising, coating said membrane on one surface with a reflecting coating, dividing a chamber into an upper and lower zone with said membrane, said reflecting coating facing said upper zone, vacuum-treating a liquid having a predetermined density to remove entrapped gases and directing the treated liquid into the lower zone under a first head, bleeding air from the lower zone so that said treated liquid is in contact with the entire exposed lower surface of said membrane, vacuum-treating a hardenable liquid plastic material having a density equal to said predetermined density to remove entrapped gases and directing the treated liquid plastic material into the upper zone under a second head and into contact with the entire exposed coated upper surface of said membrane, adjusting the first and second heads to achieve a desired paraboloidal curvature of the membrane, and hardening the liquid plastic material adhering the coated membrane thereto.

9. A method of utilizing two substantially transparent membranes to form an optical plastic lens comprising, dividing a chamber into a first zone, a second zone, and a third zone intermediate said first and second zones with said membranes, directing into the first zone a liquid under a first predetermined head and into contact with substantially the entire surface of one side of a first one of said membranes, directing into the second zone a liquid under a second predetermined head and into contact with substantially the entire surface of one side of a second one of said membranes, directing into the third zone a hardenable liquid plastic material transparent in its hardened state under a third predetermined head and into contact with substantially the entire opposite surfaces of the first and second membranes, and hardening the liquid plastic material.

10. Apparatus for making a curved surface comprising, a first right cylindrical side wall defining a hardenable liquid plastic receiving first chamber, a second right cylindrical side wall of substantially the same inner diameter as said first side wall and having a bottom closure forming a second chamber, an edge of said second side wall remote from said bottom closure and an edge of said first side wall having mating surfaces, said bottom closure having a conduit receiving opening, a bleed valve in said second side wall communicating with said second chamber, clamping means positioned externally of said first and second side walls for clamping said first and second side walls together in axial alignment with said mating surfaces adjacent and with a membrane clamped therebetween, said membrane separating said first and second chambers, a liquid reservoir, a flexible conduit having an opening into said liquid reservoir and connecting with said conduit receiving opening in said bottom closure providing a liquid path from said reservoir to said second chamber for filling said second chamber with liquid under a first predetermined head, diametrically opposed external bearing projections on said second side wall equally spaced from said bleed valve, stationary bearing support members engaging said bearing projections and mounting said second side wall and bottom closure for rotary movement about an axis extending between said bearing projections from a position with the membrane horizontal to a position with the membrane vertical and with the bleed valve uppermost to bleed air from said second chamber, and locking means for locking said second side wall and bottom closure with the membrane in a horizontal position, the edge of the first side wall opposite the edge having the mating surface defining an opening for receiving hardenable liquid plastic material under a second predetermined head, the difference between said first and second heads causing said membrane to take a curved configuration.

11. Apparatus as defined in claim 10 in which the bottom closure is provided with first and second spaced transparent windows, and further including, light projector means fixed to said bottom closure externally of said second chamber adjacent said first window projecting a thin collimated beam of light through said first window impinging on said membrane at an angle to the surface thereof for reflection by said membrane onto said second window, the position of the reflected light indicating the amount of curvature of the curved configuration of the membrane.

References Cited by the Examiner

UNITED STATES PATENTS

| 1,884,529 | 10/1932 | Benner et al. | 264—314 |
| 2,332,674 | 10/1943 | Smith | 264—40 |
| 2,760,233 | 8/1956 | Bjorksten | 264—88 |

ALEXANDER H. BRODMERKEL, *Primary Examiner.*

J. R. DUNCAN, B. SNYDER, *Assistant Examiners.*